US011954090B1

(12) United States Patent
Mandala et al.

(10) Patent No.: US 11,954,090 B1
(45) Date of Patent: Apr. 9, 2024

(54) PROCESSING AND VALIDATING OF DATA

(71) Applicant: Amazon Technologies, Inc., Seattle, WA (US)

(72) Inventors: Venkata Harish Mandala, San Jose, CA (US); Andygibb Halim, Redmond, WA (US); Amiya Kishor Chakraborty, Seattle, WA (US); Sayali Subhash Degaonkar, Seattle, WA (US); Shahinaz S Azazy, Bothell, WA (US); Ajay Avinash Kulkarni, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 17/546,891

(22) Filed: Dec. 9, 2021

(51) Int. Cl.
*G06F 16/00* (2019.01)
*G06F 16/23* (2019.01)
*G06F 16/25* (2019.01)

(52) U.S. Cl.
CPC ........ *G06F 16/2365* (2019.01); *G06F 16/254* (2019.01)

(58) Field of Classification Search
CPC .... G06F 16/254; G06F 16/285; G06F 16/335; G06F 16/24573
See application file for complete search history.

(56) References Cited

U.S. PATENT DOCUMENTS

2020/0004863 A1* 1/2020 Kumar .................... G06N 7/01

OTHER PUBLICATIONS

Vassiliadis et al., "Extraction, Transformation, and Loading," Encyclopedia of Database Systems, 2009, Citeseer, pp. 1-10. (Year: 2009).*
Li et al., "The Research and Application of an ETL Model Based on Task," The 1st International Conference on Information Science and Engineering, 2009, pp. 1006-1009. (Year: 2009).*

* cited by examiner

*Primary Examiner* — Cheryl Lewis
(74) *Attorney, Agent, or Firm* — Davis Wright Tremaine LLP

(57) ABSTRACT

Techniques and systems can process data of a dataset to determine when a portion of data is comprised in the data of the dataset. An output generated from processing the data of the dataset can be evaluated, where the output can signify that processing the data of the dataset was unable to locate the portion of data in the data of the dataset. Based on evaluating the output, the data of the dataset can be automatically reprocessed to determine the portion of data is in the data of the dataset. A result can then be generated from the portion of data determined to be in the data of the dataset.

26 Claims, 7 Drawing Sheets

PROCESSING AND VALIDATING OF DATA

BACKGROUND

Large internet-based enterprises such as e-commerce companies generally collect and store large amounts of data including customer information, product information, sales records, shipping data, operations data, web site interaction related data, and the like. Inventory control, accounting, e-commerce merchandising, and a host of other endeavors often generate the collected and stored data. Data warehouses, server farms, and the like receive, store, and provide the data to and from one or more entities. The accuracy of such data is paramount to the reliability of and confidence in actions that use the data.

BRIEF DESCRIPTION OF THE DRAWINGS

Various techniques will be described with reference to the drawings, in which.

DETAILED DESCRIPTION

Figure 1:
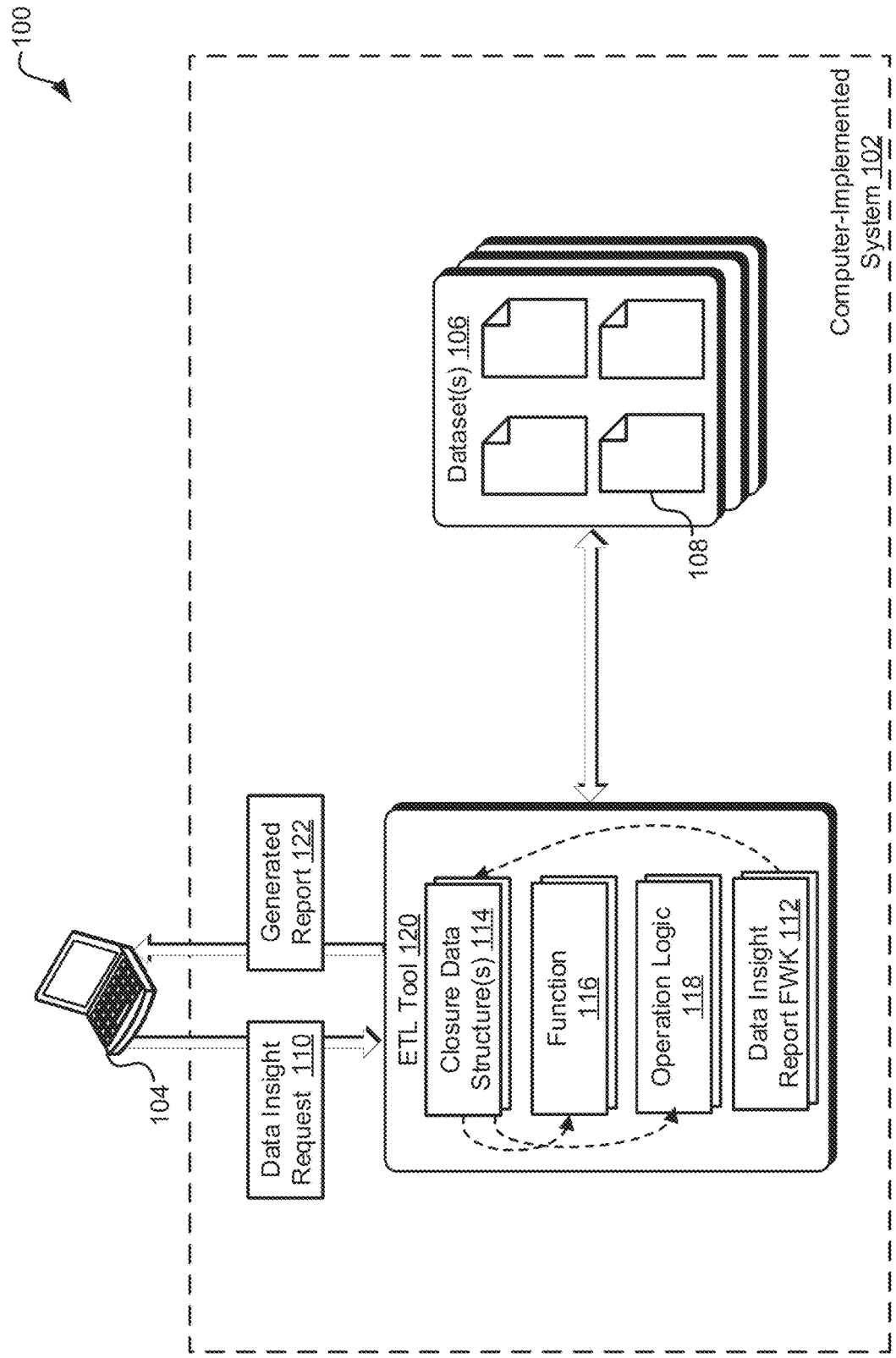
FIG. 1 illustrates an example system environment that can generate data insights from reliable data, according to at least one embodiment.

Described techniques, systems, and apparatuses process data to generate reports that include information derived from processing the data. For example, the reports can include business insight information derived or determined from the data. The data can include data originating from diverse sources including various web services and merchant e-commerce sites. The data can be contained in various structured and/or unstructured datasets that are stored in multitenant data lakes or data warehouses. However, the datasets can include data that is associated in the datasets with varying predictability and cadence. The manner in which the data is associated with the datasets can result in sparseness and/or spiky data volumes. Furthermore, the records of the data, added and/or included in the datasets, might be out of order due to processing delays associated with adding records to the data. Leveraging such unreliable data to generate reports that include insight information is undesirable. Specifically, unreliable data often generates unreliable insight information. Furthermore, use of unreliable data to generate reports consumes compute resources unnecessarily.

The described techniques, systems, and apparatuses introduce a data structure (e.g., a closure data structure) that can be used to determine when data is sufficiently reliable for use in generating insight information. The data structure can be used by an extract, transform, load (ETL) processor or tool to determine when data is sufficiently reliable for generating insight information. Furthermore, the data structure can be used to automatically update data determined to be unreliable. For example, the data structure can be leveraged to analyze data to determine when the data can be expected to generate reliable insight information. When the analysis performed based on the data structure determines that the data is unreliable, the data can be re-analyzed using the logic identified by the data structure to determine an updated reliability status of the data.

In at least one example, the data structure can include metadata. The metadata can identify a function that, when executed, processes data of one or more datasets to determine when the one or more datasets include data usable to generate reliable insight information, such as one or more reports containing insight information derived from data. One or more parameters can be defined and processed by the function to determine that the data is usable to generate reliable insight information. For example, a parameter can be associated with a geographical locale or region, and desired insight information is to be derived from data linked to the geographical locale or region. In another example, the parameter can indicate a particular timeframe, such as a date range or time range, and desired insight information is to be derived from data that corresponds to the particular timeframe.

The function, based on the parameter associated with the geographical locale or region, for example, can process the data of the one or more datasets to determine if a portion of the data includes metadata or other identifying information matching the geographical locale or region of the parameter. When the function is able to locate data including metadata or other identifying information matching the geographical locale or region of the parameter, an ETL processor or tool can perform an operation on the located data to generate reliable insight information. Alternatively, when the function is unable to locate data including metadata or other identifying information matching the geographical locale or region of the parameter, an ETL processor or tool can automatically (e.g., requiring no customer or developer interaction) reexecute the function to determine if a portion the data includes metadata or other identifying information matching the geographical locale or region of the parameter.

The reexecution of the function can occur immediately after determining that the necessary data is not found in the data of the one or more datasets. Alternatively, the automatic reexecution of the function can occur after a predetermined delay. Furthermore, when the function is unable to locate data including metadata or other identifying information matching the geographical locale or region of the parameter, the ETL processor or tool can automatically reexecute the function, repeatedly, until data including metadata or other identifying information matching the geographical locale or region is found in the data of the one or more datasets. Again, when the function is able to locate data including metadata or other identifying information matching the geographical locale or region of the parameter, the ETL processor or tool can perform the operation on the located data to generate reliable insight information.

The metadata of the data structure can include additional identifying information. For example, the metadata can identify computer-implemented storage locations for one or more datasets including data that can be processed to generate insight information. The metadata can also identify computer-implemented storage locations for one or more datasets to receive the generated insight information. In at least one example, the insight information is comprised in data generated from one or more operations or logic of an ETL processor or tool implemented or used by an e-commerce entity, such as an online service provider.

Additionally, the metadata of the data structure can include identifying information for the one or more operations or logic of the ETL processor or tool used to generate the insight information. The ETL processor or tool can reference the identifying information for the one or more operations or logic to call or execute the necessary one or more operations or logic to generate the insight information pertaining to data identified in one or more datasets based on at least one function and associated one or more parameters.

The metadata of the data structure can identify additional functions used to determine when data of one or more datasets is reliable or sufficient for use in generating insight information. For example, the metadata of the data structure can identify a function that, when executed, determines a freshness of the data of one or more datasets. Specifically, the function can process a parameter used to determine if the data of the one or more datasets was allocated to the one or more datasets in a timely manner. In an example, the function can be executed to identify metadata of the data indicating when the data was created and when the data was subsequently associated with the one or more datasets.

The function can analyze the metadata of the data to determine a duration of time that occurred between a time the data was created and a time the data was associated with the one or more datasets. Timestamp data associated with data can identified through analysis of the metadata. The parameter used to determine if the data of the one or more datasets was allocated to the one or more datasets in a timely manner can be a threshold time value, such as a timestamp data threshold value. When the duration of time that occurred between the time the data was created and the time the data was associated with the one or more datasets exceeds the threshold time value, an ETL processor or tool can determine that at least a portion of the data of the one or more datasets is not reliable or sufficient for use in generating insight information. Such a determination can trigger or cause the ETL processor or tool to automatically reexecute the function to analyze the metadata of the data to determine a duration of time that occurred between a time the data was created and a time the data was associated with the one or more datasets. Such a determination can also trigger or cause the ETL processor or tool to automatically execute other functions identified in the metadata of the data structure.

In another example, when execution of the function, based on a parameter defining a threshold time value, determines that the duration of time that occurred between the time the data was created and the time the data was associated with the one or more datasets does not exceed the threshold time value, the ETL processor or tool can determine that at least a portion of the data of the one or more datasets is reliable or sufficient for use in generating insight information. Such a determination can trigger or cause the ETL processor or tool to generate insight information using the portion of the data of the one or more datasets found to be reliable or sufficient based on execution of the function. Specifically, the metadata of the data structure can include identifying information for the one or more operations or logic of the ETL processor or tool used to generate the insight information. The ETL processor or tool can reference the identifying information for the one or more operations or logic to call or execute the necessary one or more operations or logic to generate the insight information pertaining to data identified in one or more datasets based on at least one function and associated one or more parameters.

The metadata of the data structure can identify additional functions used to determine when data of one or more datasets is reliable or sufficient for use in generating insight information. For example, the metadata of the data structure can identify a function that, when executed, analyzes the data of the one or more datasets or a portion of data of the one or more datasets to perform a data quality check on the data or the portion of the data of the one or more datasets. In an example, this function, when executed, can analyze one or more records of the data or the portion of data to determine when expected data is missing and/or to determine if the data or the portion of data includes one or more records identifying values or other information determined to be spurious or incorrect. A determination, based on the function, that a threshold amount of data associated with the data or the portion of data of the one or more datasets is missing and/or determined to be spurious or incorrect, can cause an ETL processor or tool to automatically reexecute one or more functions identified in the metadata of the data structure.

The additional functions identified in the metadata of the data structure can include a reference to a function that, when executed, determines when a minimal amount of data is associated with the data of the one or more datasets or a portion of data of the one or more datasets. For example, the function can have an associated parameter that allows the function to determine when the data equals or exceeds at least a threshold amount of data. The threshold amount can correspond to a minimum number of records needed to produce reliable and predictable insight information pertaining to data identified in one or more datasets. The function can analyze the data of the one or more datasets or the portion of data of the one or more datasets to determine if a number of records in the data at least exceeds the threshold amount corresponding to the minimum number of records. A determination, based on the function, that the data of the one or more datasets or a portion of data of the one or more datasets does not equal or exceed the threshold amount of data can cause an ETL processor or tool to automatically reexecute one or more functions identified in the metadata of the data structure.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example system environment 100 that can generate data insights from reliable data, according to at least one embodiment. The example system environment 100 can include a computer-implemented system 102. The computer-implemented system 102 can comprise various computational resources, including virtual computer instances, applications, services, processes, web servers, computer storage, database instances, networking components, and so on. In some embodiments, the computer-implemented system 102 can be hosted in the cloud by an online service provider.

The computer-implemented system 102 can comprise hosted multi-tenant provider networks. The computer-implemented system 102 can be associated with a number of networks, such as the Internet and/or one or more private networks. Clients, such as client computing devices or other interfaces, can use the network to interface with the computer-implemented system 102. Clients can include entities or individuals that contract with an operator associated with the computer-implemented system 102 to obtain computational services provided by the operator of the computer-implemented system 102. In some embodiments, the client can be resource owners, resource developers, compliance managers, other users or entities, and so on. In at least one embodiment, a client can use a computing device 104 to interface with the computer-implemented system 102.

The computer-implemented system 102 can host a dataset 106. As illustrated, there can be a plurality of datasets hosted by the computer-implemented system 102. In at least one embodiment, one or more of the plurality of datasets can be hosted by the computer-implemented system 102 across distributed computer-implemented storages. The storages can be co-located in a data lake or data warehouse and/or the storages can be a distributed across multiple data lakes or data warehouses.

The dataset 106 can comprise customer information associated with a customer or client of an online service provider. In an example, the dataset 106 can comprise customer information linked to user interactions associated with a customer's website, such as an e-commerce website or portal. In at least one embodiment, the e-commerce website or portal can be hosted by an online service provider, such as an online service provider associated with the computer-implemented system 102.

The computer-implemented system 102 can be configured to log and store data in the dataset 106 corresponding to user interactions associated with the customer's website. The stored data in the dataset 106 can include data organized in one or several tables including data corresponding to user identifiers, order identifiers, order information, shipping status information, individual item cost information, total order cost information, etc. The stored data in the dataset 106 can also comprise collected information pertaining to users' usage of the e-commerce website. This collected information can includes users' mouse movements, mouse hovers, mouse clicks, and other similar events, associated with one or more items offered for sale through the e-commerce website and/or other features associated with the e-commerce website. The data in the dataset 106 can be segmented into a plurality of records 108, where individual records of the plurality of records 108 can correspond to a distinct user of the customer's website. Each record of the plurality of records 108 can include the described collected information pertaining to a user's usage of the e-commerce web site. Furthermore, in at least one embodiment, each record of the plurality of records 108 can include collected information pertaining to a user's mouse movements, mouse hovers, and other similar events, associated with one or more items that are features associated with the e-commerce website.

In at least one embodiment, the data in the dataset 106 can include other metadata. The metadata can identify when some or all of the data was generated. Additionally, the metadata can identify when some or all the data was stored in the dataset 106. Therefore, it is possible to determine, from the metadata, a duration of time that elapsed between the generation of the data and when the data was stored in or associated with the dataset 106. The metadata associated with the data in the dataset 106 can correspond to each individual record 108 in the data in the dataset 106. For example, metadata associated with an individual record 108 in the data stored in the dataset 106 can indicate when the record 108 was created and/or updated. Furthermore, in at least one embodiment, the metadata associated with an individual record 108 in the data stored in the dataset 106 can indicate when the record 108 was caused to be stored in the dataset 106. Other metadata can also be associated with individual records 108 in the data stored in the dataset 106. For example, the metadata can identify a geographical locale or area of an e-commerce website or portal that generated one or more of the individual records 108 in the data stored in the dataset 106. In another example, the metadata can identify a geographical locale or area of one or more computer-implemented storages hosting the data stored in the dataset 106.

A client or customer, such as a client using the computing device 104, can generate and communicate a data insight request 110 to the computer-implemented system 102. The data insight request 110 can be associated with one or more reports that can be generated by the computer-implemented system 102 based on the customer's data stored in one or more of the datasets 106. In at least one embodiment, data insight request 110 can correspond to a report that can include data corresponding to calculated or determined total sales over some requested time period. In at least one embodiment, the data insight request 110 can correspond to a report that can include data corresponding to how many distinct users accessed the client's e-commerce website or portal over some requested time period. In at least one embodiment, the data insight request 110 can correspond to a report that can include data corresponding to user selections (e.g., through mouse clicks) of various items associated with the customer's e-commerce website or portal.

Other types of reports and reporting tools can be offered by the computer-implemented system 102. For example, the computer-implemented system 102 can leverage data of one or more of the datasets 106 to create or generate reports on items in a customer's inventory according to the information in the data or a portion of data comprised in the dataset(s) 106. These reports can be specific and include information on groups of items, item details, items for sale electronically, items in the inventory, items out of stock, and similar such subjects as selected by the customer or predefined by parameters of the report(s). In some embodiments, reports can be generated to, among other things, display in real-time the number and identity of customers visiting an e-commerce website or portal and/or the number of customers actively browsing or purchasing items from the website or portal. The generated reports can also include graphs, charts, and icons that represent real-time consumer activity.

As described, a client, using the computing device 104, can submit the data insight request 110 to the computer-implemented system 102. In at least one embodiment, the data insight request 110 can be received by an ETL tool 120. In at least one embodiment, the ETL tool 120 is realized using computer-executable instructions hosted by the computer-implemented system 102. These computer-executable instructions can be processed and/or executed by one or more processors of the computer-implemented system 102 in order to provide the functionality of the ETL tool 120. In at least one embodiment, the ETL tool 120 is realized through a combination of computer-executable instructions and computer-implemented hardware.

The ETL tool 120 can interface with one or more datasets, such as the dataset 106. The ETL tool 120 can interface with the dataset 106 to retrieve data, such as records of the data comprised the dataset 106. The retrieved data can be used to generate data insight reports requested by customers of an online service provider associated with the computer-implemented system 102.

The ETL tool 120 can process the data insight request 110 to identify a report framework that is associated with the data insight request 110. In at least one embodiment, the ETL tool 120 uses the identified report to search for or identify a data insight report framework 112 hosted by the ETL tool 120 and/or the computer-implemented system 102. In at least one embodiment, the ETL tool 120 and/or the computer-implemented system 102 can host a plurality of data insight report frameworks that can be used to generate reports requested by customers interfacing with the ETL tool 120 and/or the computer-implemented system 102. The plurality of data insight report frameworks hosted by the ETL tool 120 can be associated with one or more predefined reports and/or one or more user or customer created reports that can be generated by the ETL tool 120. In at least one embodiment, each one of the plurality of data insight report frameworks hosted by the ETL tool 120 provides a framework for generating a report that is deliverable to a requesting client such as the client using the computing device 104.

A report framework (e.g., the data insight report framework 112) can define the type of data needed to generate the report. For example, a framework can identify one or more datatypes associated with one or more data sources or datasets that one or more functions or operations should process in order to generate a data insight report. For example, a framework associated with a data insight report corresponding to user traffic on a customer's e-commerce website or portal can specify that data corresponding to user login information on the customer's e-commerce web site or portal is needed to generate the data insight report corresponding to user traffic. In another example, a framework associated with a data insight report corresponding to total sales over a configurable time period can specify that data corresponding to user purchases derived from the customer's e-commerce website or portal is needed to generate the data insight report corresponding to total sales.

The data insight report framework 112 can also specify one or more data structures 114 (i.e., closure data structure 114). In at least one embodiment, the data structure 114 can be leveraged or used by the ETL tool 120 to determine a "health" of the data needed to generate a report associated with the data insight report framework 112. As described herein, the ETL tool 120 can use the data structure 114 to "heal" the data needed to generate the report associated with the data insight report framework 112. The healing process of the data, made possible using the data structure 114, can involve a plurality of automated data analysis loops performed on the data needed to generate the report associated with the data insight report framework 112.

In at least one embodiment, the data structure 114 is a document containing information. In at least one embodiment, the data structure 114 comprises human readable syntax. In at least one embodiment, the data structure 114 includes one or more pointers to one or more functions, operations, logic, input datasets, output datasets, and the like. In at least one embodiment, the data structure 114 includes metadata corresponding to the one or more pointers and/or other information contained in the data structure 114. The one or more functions, operations, logic, input datasets, output datasets, and the like can be stored or hosted by the computer-implemented system 102 in one or more computer-implemented storages. These one or more computer-implemented storages can be co-located and/or distributed across various data lakes or data warehouses. In at least one embodiment, the identified input and/or output datasets can correspond to one or more of the datasets 106. In at least one embodiment, the one or more functions, operations, and logic identified by the data structure 114 can comprise instructions, such as computer-executable instructions, hosted by computer storage of the computer-implemented system 102.

As described in the foregoing, the ETL tool 120 can receive the data insight request 110. The ETL tool 120 can analyze the data insight request 110 to determine if at least one of the data insight report frameworks, such as the data insight report framework 112, can be used to generate a data insight report identified by the data insight request 110. The data insight request 110 can comprise information identifying a data insight report requested by a customer or client using the computing device 104.

The data insight report framework 112 can identify at least one closure data structure, such as the data structure 114. The data structure 114 can identify at least one function that can be executed to identify and locate data that can be used to generate a data insight report associated with the data insight report framework 112. Metadata of the data structure 114 can identify the at least one function. Using this metadata of the data structure 114, the ETL tool 120 can locate the necessary at least one function, such as the function 116.

In at least one embodiment, the function 116 can be executed by the ETL tool 120. Specifically, the function 116 can have associated computer-executable instructions that are executed by the ETL tool 120 through the use of one or more processors associated with the computer-implemented system 102 and/or the ETL tool 120.

The function 116, when executed, processes data of the one or more datasets 106 to determine when the one or more datasets 106 include data usable to generate reliable insight information, such as one or more reports containing insight information derived from data. One or more parameters can be defined and processed by the function 116 to determine that the data is usable to generate reliable insight information. For example, a parameter can be associated with a geographical locale or region, and desired insight information is to be derived from data linked to the geographical locale or region. In another example, the parameter can indicate a particular timeframe, such as a date range or time range, and desired insight information is to be derived from data that corresponds to the particular timeframe.

In at least one embodiment, the function 116, based on the parameter associated with the geographical locale or region, for example, can process the data of the one or more datasets 106 to determine if a portion of the data includes metadata or other identifying information matching the geographical locale or region of the parameter. When the function 116 is able to locate data including metadata or other identifying information matching the geographical locale or region of the parameter, the ETL tool 120 can perform an operation on the located data to generate reliable insight information. For example, the ETL tool 120 can use operation logic 118 to generate the reliable insight information. Alternatively, when the function 116 is unable to locate data including metadata or other identifying information matching the geographical locale or region of the parameter, the ETL tool 120 can automatically (e.g., requiring no customer or developer interaction) reexecute the function 116 to determine if a portion of the data associated with the one or more datasets 106 includes metadata or other identifying information matching the geographical locale or region of the parameter.

In at least one embodiment, the data structure 114 identifies the operation logic 118 to generate the reliable insight information.

The reexecution of the function 116 can occur immediately after determining that the necessary data is not found in the data of the one or more datasets 106. Alternatively, the automatic reexecution of the function 116 can occur after a predetermined delay. Furthermore, when the function 116 is unable to locate data including metadata or other identifying information matching the geographical locale or region of the parameter, the ETL tool 120 can automatically reexecute the function, repeatedly, until data including metadata or other identifying information matching the geographical locale or region is found in the data of the one or more datasets 106. Again, when the function 116 is able to locate data including metadata or other identifying information matching the geographical locale or region of the parameter, the ETL tool 120 can perform the operation on the located data to generate reliable insight information, such as generating a report 122 that is communicated to a client or customer interfacing with the computing device 104.

The metadata of the data structure 114 can include additional identifying information. For example, the metadata can identify computer-implemented storage locations for one or more datasets 106 including data that can be processed to generate insight information. The metadata can also identify computer-implemented storage locations for one or more datasets to receive the generated insight information. These output datasets can be associated with the datasets 106. In at least one example, the insight information is comprised in data generated from one or more operations or logic of the ETL tool 120, such as the operation logic 118.

Additionally, the metadata of the data structure 114 can include identifying information for the one or more operations or logic 118 of the ETL tool 120 used to generate the insight information included in the generated report 122. The ETL tool 120 can reference the identifying information for the one or more operations or logic 118 to call or execute the necessary one or more operations or logic 118 to generate the insight information pertaining to data identified in one or more datasets 106 based on at least one function 116 and associated one or more parameters.

The metadata of the data structure 114 can identify additional functions used to determine when data of one or more datasets 106 is reliable or sufficient for use in generating insight information. For example, the metadata of the data structure 114 can identify a function that, when executed, determines a freshness of the data of one or more datasets 106. This additional function can be associated with a plurality of functions (e.g., functions 116) accessible by the ETL tool 120. Specifically, the function can process a parameter used to determine if the data of the one or more datasets 106 was allocated to the one or more datasets 106 in a timely manner. In an example, the function can be executed to identify metadata of the data indicating when the data was created and when the data was subsequently associated with the one or more datasets 106.

The additional function can analyze the metadata of the data, including one or more timestamps in one example, to determine a duration of time that occurred between a time the data was created and a time the data was associated with the one or more datasets 106. The parameter used to determine if the data of the one or more datasets 106 was allocated to the one or more datasets 106 in a timely manner can be a threshold time value, such as a timestamp data threshold. When the duration of time that occurred between the time the data was created and the time the data was associated with the one or more datasets 106 exceeds the threshold time value, the ETL tool 120 can determine that at least a portion of the data of the one or more datasets 106 is not reliable or sufficient for use in generating insight information for association with one or more reports that can be delivered to a customer or client. Such a determination can trigger or cause the ETL tool 120 to automatically reexecute the function to analyze the metadata of the data to determine a duration of time that occurred between a time the data was created and a time the data was associated with the one or more datasets 106. Such a determination can also trigger or cause the ETL tool 120 to automatically execute other functions identified in the metadata of the data structure.

In another example, when execution of the function, based on a parameter defining a threshold time value, determines that the duration of time that occurred between the time the data was created and the time the data was associated with the one or more datasets 106 does not exceed the threshold time value, the ETL tool 120 can determine that at least a portion of the data of the one or more datasets 106 is reliable or sufficient for use in generating insight information. Such a determination can trigger or cause the ETL tool 120 to generate insight information using the portion of the data of the one or more datasets 106 found to be reliable or sufficient based on execution of the function. Specifically, as described, the metadata of the data structure 114 can include identifying information for the one or more operations or logic 118 of ETL tool 120 used to generate the insight information. The ETL tool 120 can reference the identifying information for the one or more operations or logic 118 to call or execute the necessary one or more operations or logic to generate the insight information pertaining to data identified in one or more datasets 106 based on at least one function and associated one or more parameters.

The metadata of the data structure 114 can identify additional functions used to determine when data of one or more datasets is reliable or sufficient for use in generating insight information. In at least one implementation, the additional functions identified by the data structure 114 can be associated with one or more of the functions 116. For example, the metadata of the data structure 114 can identify a function that, when executed, analyzes the data of the one or more datasets 106 or a portion of data of the one or more datasets 106 to perform a data quality check on the data or the portion of the data of the one or more datasets 106. In at least one embodiment, the portion of the data of the one or more datasets 106 can correspond to data identified by an earlier executed function that is identified in the data structure 114. In an example, the additional function, when executed, can analyze one or more records (e.g., records 108) of the data or the portion of data to determine when expected data is missing and/or to determine if the data or the portion of data includes one or more records identifying values or other information determined to be spurious or incorrect. A determination, based on the function, that a threshold amount of data associated with the data or the portion of data of the one or more datasets is missing and/or determined to be spurious or incorrect can cause the ETL tool 120 to automatically reexecute one or more functions identified in the metadata of the data structure.

In at least one embodiment, the additional functions identified in the metadata of the data structure 114 can include a reference to a function (e.g., of the functions 116) that when executed determines when a minimal amount of data is associated with the data of the one or more datasets 106 or a portion of data of the one or more datasets 106. For example, the function can have an associated parameter that allows the function to determine when the data equals or exceeds at least a threshold amount of data. The threshold amount can correspond to a minimum number of records (e.g., of the records 108) needed to produce reliable and predictable insight information pertaining to data identified in one or more datasets 106. The function can analyze the data of the one or more datasets 106 or the portion of data of the one or more datasets 106 to determine if a number of records in the data at least exceeds the threshold amount corresponding to the minimum number of records. A determination, based on the function, that the data of the one or more datasets 106 or a portion of data of the one or more datasets 106 does not equal or exceed the threshold amount of data can cause the ETL tool 120 to automatically reexecute one or more functions identified in the metadata of the data structure 114.

Figure 2:
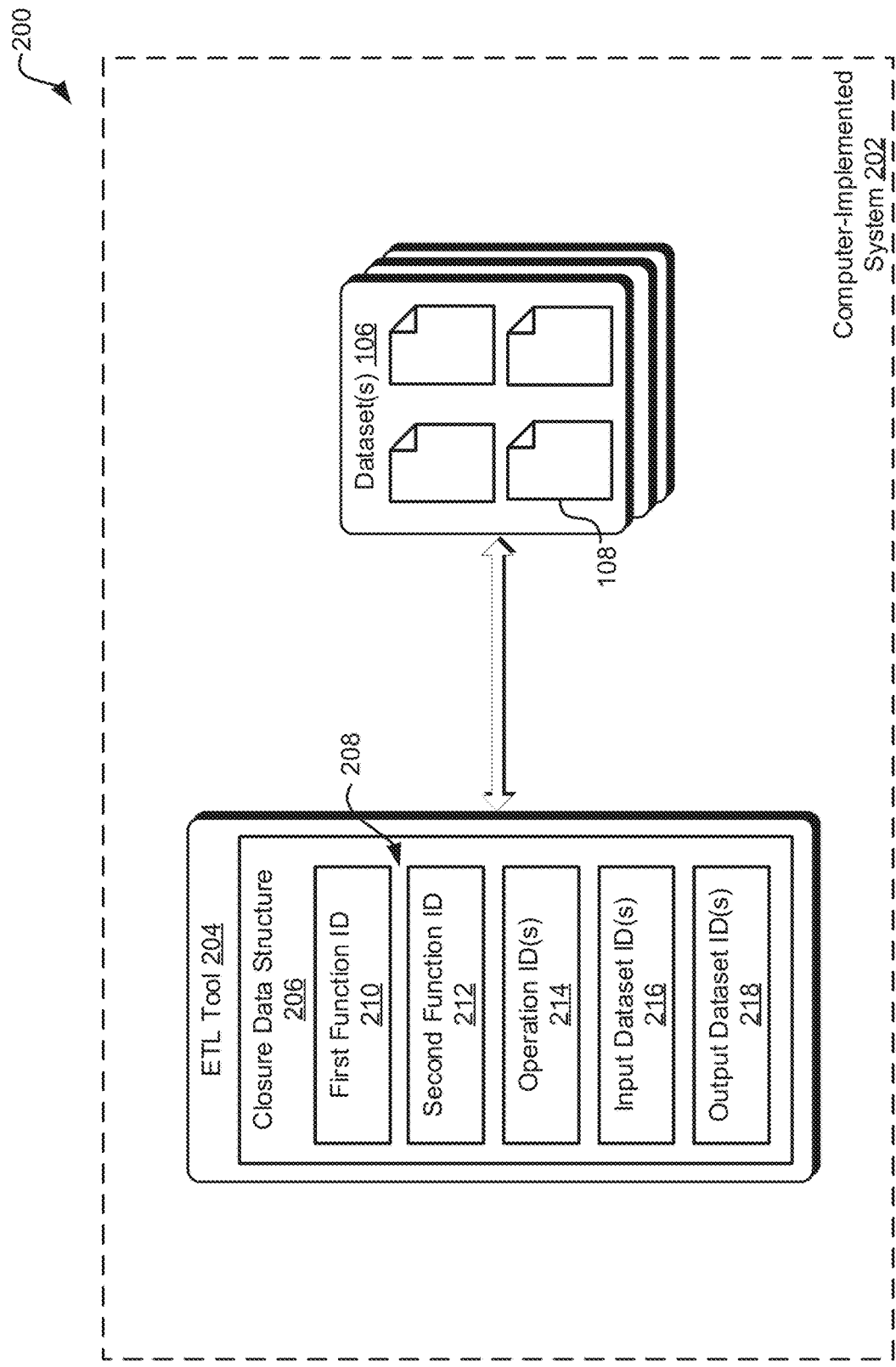
FIG. 2 illustrates an example system environment that can generate data insights from reliable data, according to at least one embodiment.

FIG. 2 illustrates an example system environment 200 that can generate data insights from reliable data, according to at least one embodiment. The example system environment 200 can include a computer-implemented system 202. The computer-implemented system 202 can comprise various computational resources, including virtual computer instances, applications, services, processes, web servers, computer storage, database instances, networking components, and so on. In some embodiments, the computer-implemented system 202 can be hosted in the cloud by an online service provider.

The computer-implemented system 202 can comprise hosted multi-tenant provider networks. The computer-implemented system 202 can be associated with a number of networks, such as the Internet and/or one or more private networks. Clients, such as client computing devices or other interfaces, can use the network to interface with the computer-implemented system 202. Clients can include entities or individuals that contract with an operator associated with the computer-implemented system 202 to obtain computational services provided by the operator of the computer-implemented system 202. In some embodiments, the client can be resource owners, resource developers, compliance managers, other users or entities, and so on. In at least one embodiment, the computer-implemented system 202 can incorporate some or all of the computer-executable instructions and hardware of the computer-implemented system 102.

The computer-implemented system 202 can comprise an associated ETL tool 204. This ETL tool 204 can comprise some or all of the functionalities, implemented by way of computer-executable instructions, of the ETL tool 120 illustrated in FIG. 1. The ETL tool 120 can comprise a data structure 206 (e.g., closure data structure). The data structure 206 can comprise some or all of the metadata of the data structure 114 illustrated in FIG. 1.

In at least one embodiment, the data structure 206 comprises metadata 208. The metadata 208 can comprise identification information for various functional elements associated with the computer-implemented system 202. In an example, the metadata 208 identifies a first function identifier 210. The first function identifier 210 can correspond to computer-executable instructions hosted by the computer-implemented system 202 in one or more computer-implemented storages of the computer-implemented system 202. In at least one embodiment, the computer-executable instructions associated with the first function identifier 210 can be caused to be executed by one or more processors of the computer-implemented system 202 to determine or locate a portion of data comprised in one or more datasets, such as in the one or more datasets 106.

At least one embodiment, computer-executable instructions associated with the first function identifier 210 can comprise or be associated with one or more parameters. These one or more parameters can be used by the computer-executable instructions associated with the first function identifier 210, when executed, to determine or locate the portion of data comprised in the one or more datasets 106. In at least one embodiment, the one or more parameters can cause the computer-executable instructions associated with the first function identifier 210 to determine or locate the portion of data corresponding to a predefined time period or duration identified by the one or more parameters processed by the computer-executable instructions associated with the first function identifier 210. In at least one embodiment, the one or more parameters can cause the computer-executable instructions associated with the first function identifier 210 to determine or locate a portion of data corresponding to a geographical locale or region. In general, the one or more parameters can cause the computer-executable instructions associated with the first function identifier 210 to determine or locate a subset of data associated with the one or more datasets 106 based on at least one filter property of the one or more parameters.

The one or more parameters can be user configured or system configured. In at least one embodiment, the one or more parameters can be user configured or system configured to specify a time period or duration that can be compared against metadata contained in or associated with the one or more datasets 106 to determine or locate the portion of data comprised in the one or more datasets 106. For example, one or more of the records 108 of the one or more datasets 106 can comprise metadata identifying time information corresponding to when the one or more records 108 was created, modified, associated in the one or more datasets 106, etc. This metadata identifying the time information can be used, with reference to the one or more parameters, through execution of computer-executable instructions to determine or locate the portion of data comprised in the one or more datasets 106. The ETL tool 204 can reexecute the computer-executable instructions associated with the first function identifier 210 when data, based on the one or more parameters, is not located in the one or more datasets 106. As described, the computer-executable instructions associated with the first function identifier 210 can be automatically reexecuted, multiple times if required, to determine or locate the portion of data corresponding to the one or more parameters, comprised in the one or more datasets 106. A configurable delay period can occur between each automatic reexecution of the computer-executable instructions associated with the first function identifier 210.

In at least one embodiment, the computer-executable instructions associated with the first function identifier 210 can be caused to be executed when a user or system intelligence (e.g., artificial intelligence) presumes, believes, or suspects that the one or more datasets 106 does not include sufficient data, such as a portion of data useable to generate business insight information. Alternatively, or in addition, in at least one embodiment, the computer-executable instructions associated with the first function identifier 210 can be caused to be executed when a user or system intelligence (e.g., artificial intelligence) needs or wants to confirm that the one or more datasets 106 does or does not include sufficient data, such as a portion of data useable to generate business insight information. In at least one embodiment, the computer-executable instructions associated with the first function identifier 210 can be caused to be executed by one or more processors of the computer-implemented system 202 to determine or locate the portion of data comprised in one or more datasets, such as in the one or more datasets 106. As descried, the execution of the computer-executable instructions associated with the first function identifier 210 can occur once or a plurality of times to confirm, determine, or locate the portion of data.

Additional functions can be identified in the metadata 208 of the data structure 206. In at least one embodiment, the metadata 208 identifies a second function identifier 212. The ETL tool 204 can execute computer-executable instructions linked to the second function identifier 212 subsequent to executing the computer-executable instructions linked to the first function identifier 210. The computer-implemented system 202 can host the computer-executable instructions linked to the second function identifier 212.

In at least one embodiment, the ETL tool 204 can cause the computer-executable instructions of the second function identifier 212 to process the portion of data determined or located based on the execution of the computer-executable instructions associated with the first function identifier 210. In at least one embodiment, the computer-executable instructions associated with the second function identifier 212, when executed, analyze the data of the one or more datasets 106 or the portion of data of the one or more datasets 106 to perform a data quality check on the data or the portion of the data of the one or more datasets 106. In an example, these computer-executable instructions, when executed, can analyze one or more records 108 of the data or the portion of data to determine when expected data is missing and/or to determine if the data or the portion of data includes one or more records 108 identifying values or other information determined to be spurious or incorrect. A determination, based on the function, that a threshold amount of data is not associated with the data or the portion of data of the one or more datasets 106 can cause the ETL tool 204 to automatically reexecute one or more functions identified in the metadata 208 of the data structure 206.

In at least one embodiment, the computer-executable instructions associated with the second function identifier 212, when executed, determine when a minimal amount of data is associated with the data of the one or more datasets 106 or a portion of data of the one or more datasets 106. For example, the computer-executable instructions associated with the second function identifier 212 can have an associated parameter that allows the computer-executable instructions associated with the second function identifier 212 to determine when the data equals or exceeds at least a threshold amount of data. The threshold amount can correspond to a minimum number of records (e.g., records 108) needed to produce reliable and predictable insight information pertaining to data identified in one or more datasets 106 or the portion of data determined from executing the computer-executable instructions associated with the first function identifier 210. The computer-executable instructions associated with the second function identifier 212 can analyze the data of the one or more datasets 106 or the portion of data of the one or more datasets 106 to determine if a number of records in the data at least exceeds the threshold amount corresponding to the minimum number of records. A determination, based on the computer-executable instructions associated with the second function identifier 212, that the data of the one or more datasets 106 or a portion of data of the one or more datasets 106 not equal or exceed the threshold amount of data can cause the ETL tool 204 to automatically reexecute computer-executable instructions associated with one or more functions identified in the metadata 208 of the data structure 114.

The metadata 208 of the data structure 206 can further comprise one or more operation identifiers 214, one or more input dataset identifiers 216, and one or more output dataset identifiers 218. The one or more operation identifiers 214 can correspond to computer-executable instructions hosted by the computer implemented system 202. The computer-executable instructions associated with the one or more operation identifiers 214 can be used to process data located or determined by one or more functions and return data and or values that can be incorporated into data insight reports requested by users and customers of the computer-implemented system 202. In at least one embodiment, the computer-executable instructions associated with the one or more operation identifiers 214 can perform arithmetic processing on data, transformations on data, aggregations on data, and so forth.

The one or more input dataset identifiers 216 of the data structure 206 can identify locations of data that can be queried by computer-executable instructions associated with one or more of the first function identifier 210 and the second function identifier 212. The one or more output dataset identifiers 218 can identify datasets to obtain and/or store data generated from executing the computer-executable instructions associated with the one or more operation identifiers 214. Specifically, the datasets identified by the one or more output dataset identifiers 218 can comprise data usable to generate one or more reports comprising insight data.

Figure 3:
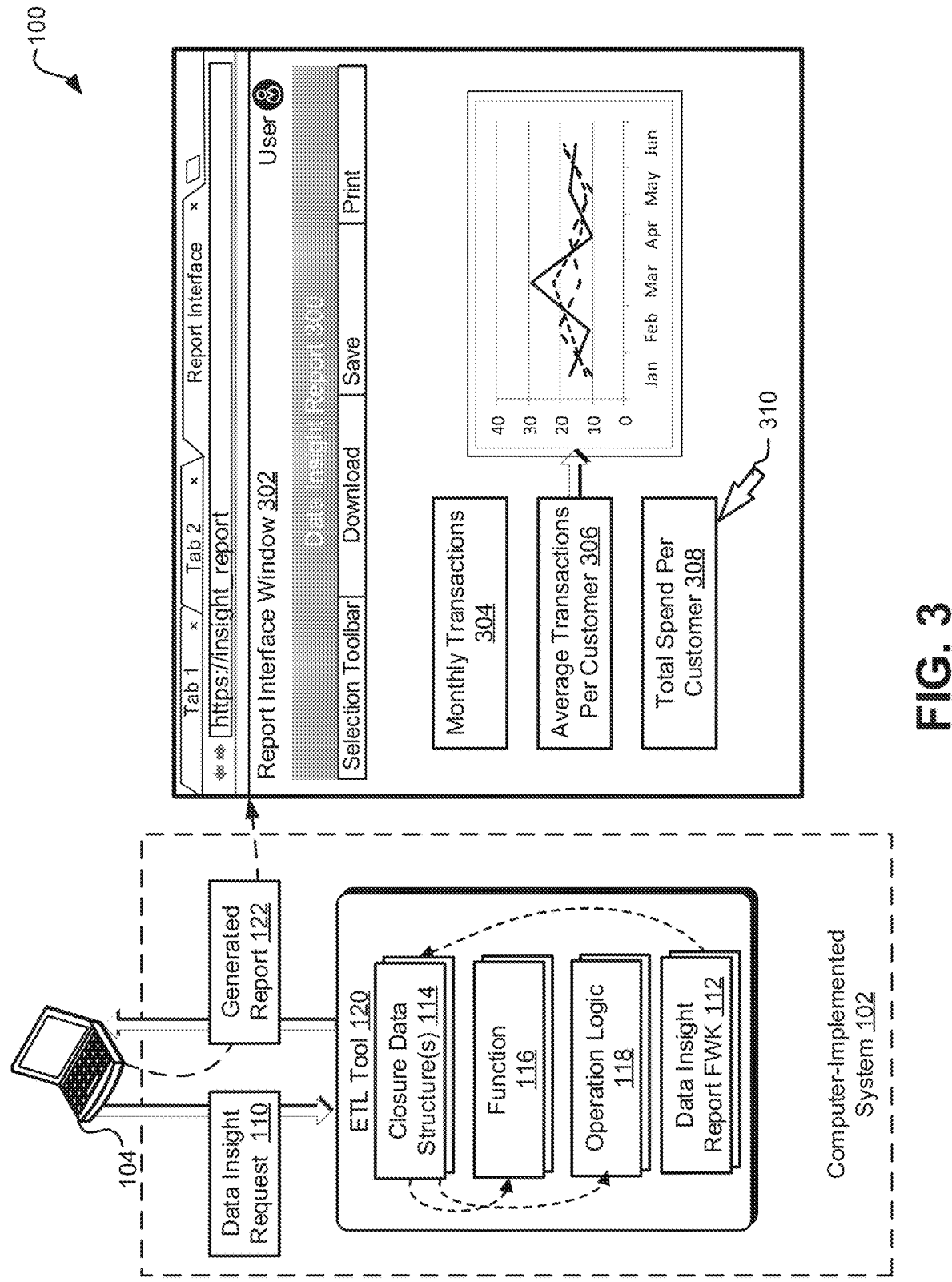
FIG. 3 illustrates a data insight report, according to at least one embodiment.

FIG. 3 illustrates a data insight report 300, according to at least one embodiment. In at least one embodiment, the data insight report 300 can be generated by the computer-implemented system 102 and/or the computer-implemented system 202. In at least one embodiment, the data insight report 300 can be comprised in or associated with the generated report 122. In at least one embodiment, the generated report 122 includes report data that is processed by the computing device 104 to display the data insight report 300 in a report interface window 302 of a report application running on the computing device 104.

The data insight report 300 can comprise a plurality of user selectable options for displaying underlying data associated with the generated report 122 and obtained in accordance with one or more of the data insight report frameworks 112 and the associated data structures 114. Specifically, the report interface window 302 can be configured to display data from a variety of perspectives. For instance, the report interface window 302 can be configured to display graphical representations associated with data corresponding to monthly transactions 304, average transactions per customer 306, and/or total spend per customer 308. A customer or user of the report interface window 302 can manipulate, using a mouse or other input device, a pointer 310 to display a desired perspective associated with data determined by the ETL tool 120.

Figure 4:
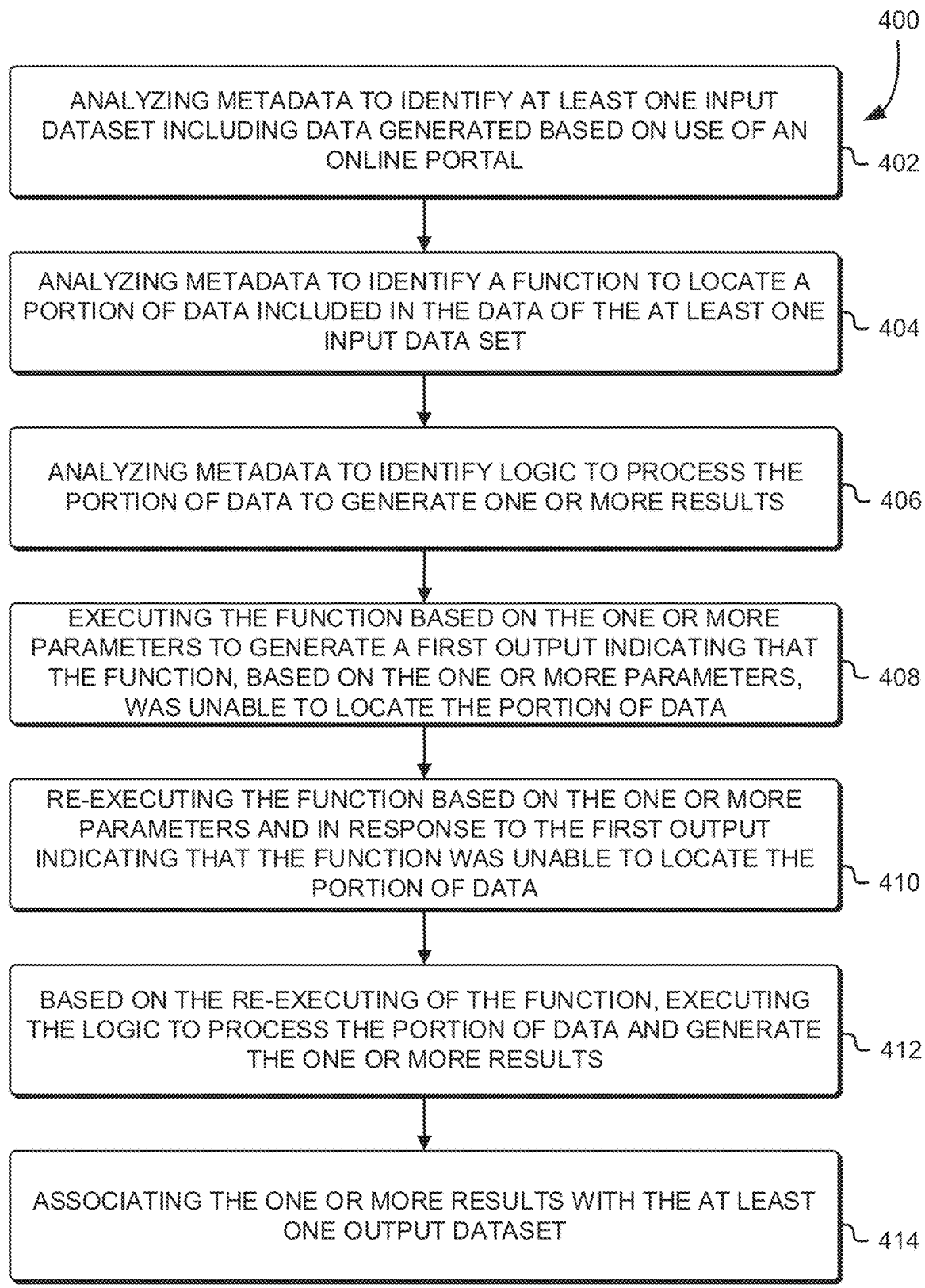
FIG. 4 illustrates an example flow diagram that may be associated with one or more of the described system environments to generate data insights, according to at least one embodiment.

FIG. 4 illustrates an example flow diagram 400 that may be associated with one or more of the described system environments to generate data insights from reliable data, according to at least one embodiment. In some implementations, the acts of the flow diagram 400 are executed by one or more computing devices of the example system environments described herein. The example system environments may execute computer-executable instructions incorporating at least some of the processing acts of the flow diagram 400 to provide generation and use of data insights from reliable data according to at least one of the embodiments described herein.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules might be implemented in software, in firmware, in special-purpose digital logic, and any combination thereof.

At 402, metadata is analyzed to identify at least one input dataset including data generated based on use of an online portal. In at least one embodiment, the metadata analyzed corresponds to metadata of the data structure 114 and/or the data structure 206. In at least one embodiment, the at least one input dataset can correspond to one or more of the datasets 106.

At 404, the metadata is analyzed to identify a function to locate a portion of data included in the data of the at least one input dataset, the function to process one or more parameters that enable the function to analyze the data of the at least one input dataset to determine when the portion of data is comprised in the data of the at least one input dataset. In at least one embodiment, the function can correspond to the function 116 associated with the ETL tool 120. In at least one embodiment, the function can correspond to a function pointed to by the first function identifier 210 or the second function identifier 212.

At 406, the metadata is analyzed to identify logic to process the portion of data and to generate one or more results. In at least one embodiment, the logic can correspond to the operation logic 118 of the ETL tool 120. In at least one embodiment, the logic can correspond to logic pointed to by the operation identifier 214 of the data structure 206. In at least one embodiment, the results generated by the logic can correspond to data underlying the generated report 122. In at least one embodiment, the results generated by the logic can correspond to one or more of the selectable report options of the data insight report 300. In at least one embodiment, the metadata is analyzed to identify at least one output dataset to hold the one or more results to be generated by the logic. In at least one embodiment, the at least one output dataset can be associated with the datasets 106.

At 408, the function based on the one or more parameters is executed to generate a first output indicating that the function, based on the one or more parameters, was unable to locate the portion of data. In at least one embodiment, the function can correspond to the function 116 of the computer-implemented system 102. In at least one embodiment, the function can correspond to one or more functions identified by the first function identifier 210 and/or the second function identifier 212. In at least one embodiment, the first output indicating that the function was unable to locate the portion of data is generated by the ETL tool 204 and/or the ETL tool 120. In at least one embodiment, the first output indicating that the function was unable to locate the portion of data is an instruction to the ETL tool 120 or ETL tool 204 to reexecute the function.

At 410, the function is reexecuted based on the one or more parameters and in response to the first output indicating that the function was unable to locate the portion of data. In at least one embodiment, the function is reexecuted by the ETL tool 120 or the ETL tool 204. In at least one embodiment, reexecuting the function generates a second output indicating that the function, based on the one or more parameters, was able to locate the portion of data. In at least one embodiment, the second output indicating that the function was able to locate the portion of data is generated by the ETL tool 120 or the ETL tool 204. In at least one embodiment, the second output is an instruction for the ETL tool 120 or the ETL tool 204 to cause the ETL tool 120 or the ETL tool 204 to execute computer-executable instructions associated with one or more operations to generate data insight results from the portion of data.

At 412, based on reexecuting the function, logic is executed to process the portion of data and generate one or more results from the located portion of data. In at least one embodiment, the logic corresponds to the operation logic 118 of the ETL tool 120. In at least one embodiment, the logic corresponds to operation logic pointed to operation identifier 214.

At 414, the one or more results generated by the logic is associated with at least one output dataset. In at least one embodiment, the one or more results generated by the logic can be associated with a report, such as the data insight report 300 and/or the generated report 122.

Figure 5:
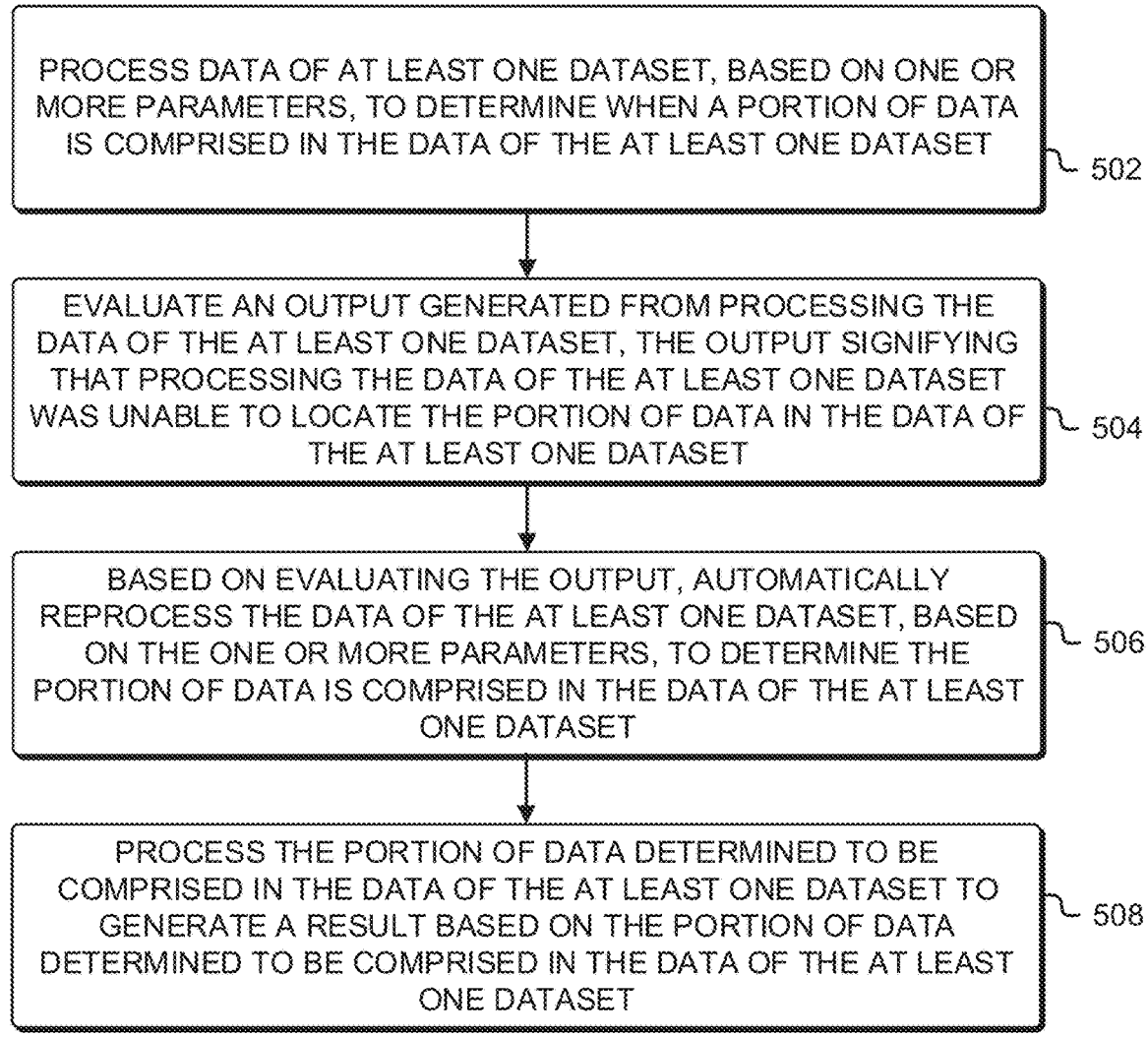
FIG. 5 illustrates an example flow diagram that may be associated with one or more of the described system environments to generate data insights, according to at least one embodiment.

FIG. 5 illustrates an example flow diagram 500 that may be associated with one or more of the described system environments to generate data insights from reliable data, according to at least one embodiment. In some implementations, the acts of the flow diagram 500 are executed by one or more computing devices of the example system environments described herein. The example system environments may execute computer-executable instructions incorporating at least some of the processing acts of the flow diagram 500 to provide generation and use of data insights from reliable data, according to at least one of the embodiments described herein.

At 502, data of at least one dataset, based on one or more parameters, is processed to determine when a portion of data is comprised in the data of the at least one dataset. In at least one embodiment, the data is processed by the ETL tool 120 and/or the ETL tool 204.

At 504, an output generated from processing the data of the at least one dataset is evaluated, where the output signifies that processing the data of the at least one dataset was unable to locate the portion of data in the data of the at least one dataset. In at least one embodiment, the output is generated by the ETL tool 120 and/or the ETL tool 204. The output can cause the ETL tool 120 and/or the ETL tool 204 to reprocess the data of the at least one dataset.

At 506, based on evaluating the output, the data of the at least one dataset can be automatically reprocessed, based on the one or more parameters, to determine the portion of data is comprised in the data of the at least one dataset. The reprocessing can be executed by the ETL tool 120 and/or the ETL tool 204. In at least one embodiment, the data of the at least one dataset can be automatically reprocessed after a predetermined delay. In at least one embodiment, the data of the at least one dataset can be automatically reprocessed a plurality of times at least until it is determined that the portion of data is comprised in the data of the at least one dataset.

At 508, the portion of data determined to be comprised in the data of the at least one dataset is processed to generate a result based on the portion of data determined to be comprised in the data of the at least one dataset. In at least one embodiment, the generated result can be stored in an output dataset, such as one or more of the datasets 106. In at least one embodiment, the result can comprise data that can be included in a data insight report, such as the data insight report 300.

Figure 6:
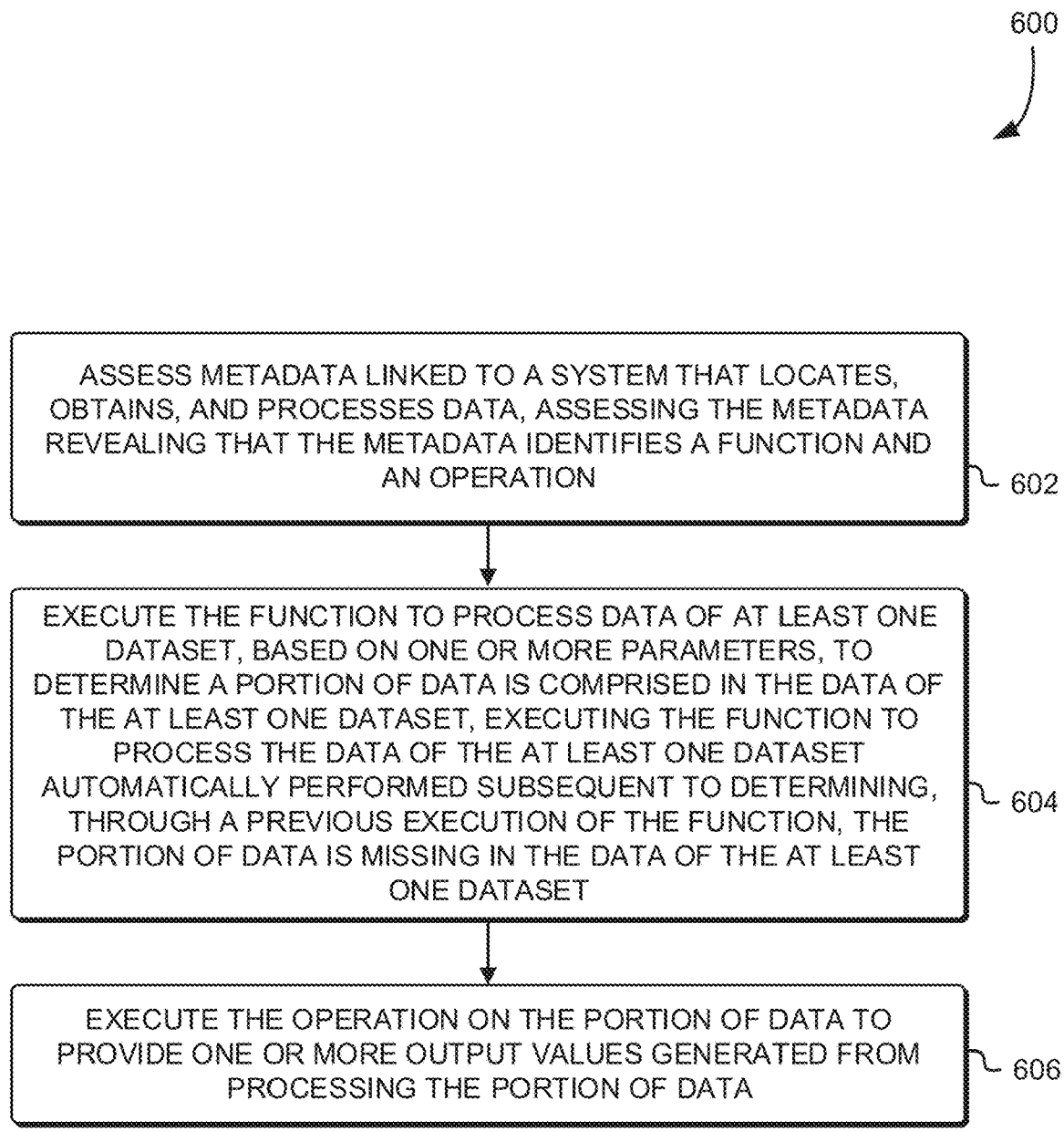
FIG. 6 illustrates an example flow diagram that may be associated with one or more of the described system environments to generate data insights, according to at least one embodiment.

FIG. 6 illustrates an example flow diagram 600 that may be associated with one or more of the described system environments to generate data insights from reliable data, according to at least one embodiment. In some implementations, the acts of the flow diagram 600 are executed by one or more computing devices of the example system environments described herein. The example system environments may execute computer-executable instructions incorporating at least some of the processing acts of the flow diagram 600 to provide generation and use of data insights from reliable data, according to at least one of the embodiments described herein.

At 602, metadata linked to a system that locates, obtains, and processes data is assessed to reveal that the metadata identifies a function and an operation. In at least one embodiment, the system corresponds to the ETL tool 120 and/or the ETL tool 204. In at least one embodiment, the metadata is associated with the data structure 114 and/or the data structure 206. In at least one embodiment, the function and the operation can be identified by identifiers associated with the metadata.

At 604, the function is executed. In at least one embodiment, the function is executed to process data of at least one dataset, based on one or more parameters, to determine a portion of data is comprised in the data of the at least one dataset. In at least one embodiment, the function is executed automatically subsequent to determining, based on a previous execution of the function, the portion of data that is missing in the data of the at least one dataset. In at least one embodiment, the function corresponds to the function 116 and/or a function identified by the first function identifier 210 or the second function identifier 212. In at least one embodiment, the at least one dataset corresponds to one or more of the datasets 106. In at least one embodiment, the function is associated with the ETL tool 120 and/or the ETL tool 204.

At 606, the operation is executed on the portion of data to provide one or more output values generated from processing the portion of data. In at least one embodiment, the operation corresponds to the operation logic 118 of the ETL tool 120. In at least one embodiment, the operation corresponds to an operation identified by the operation ID 214 of the ETL tool 204.

Figure 7:
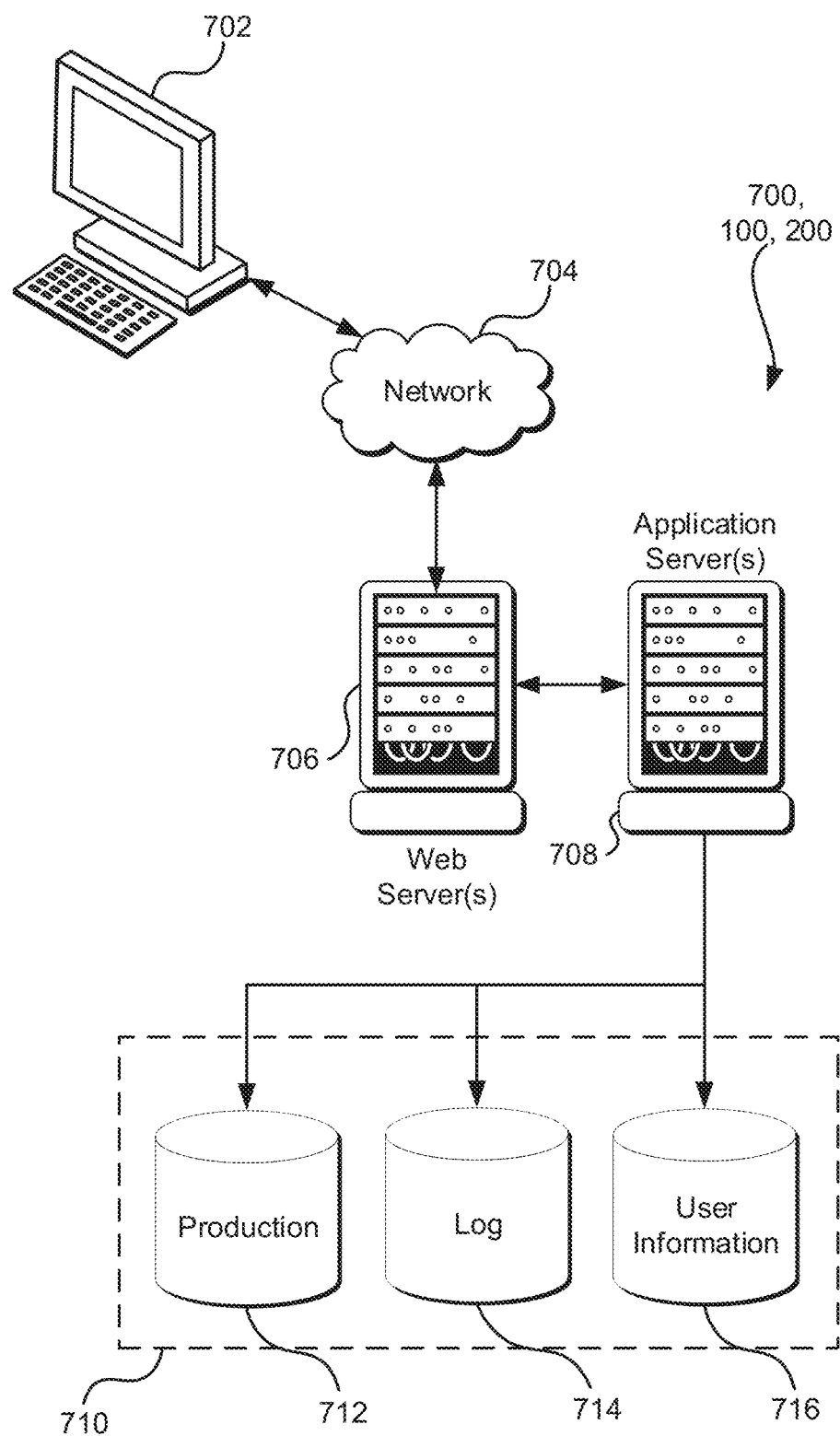
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context.

The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
analyzing metadata to identify:
- at least one input dataset including data generated based on use of an online portal;
- a function to locate a portion of data included in the data of the at least one input dataset, the function to process one or more parameters that enable the function to analyze the data of the at least one input dataset to determine when the portion of data is comprised in the data of the at least one input dataset;
- logic to process the portion of data to generate one or more results; and
- at least one output dataset to hold the one or more results;

executing the function based on the one or more parameters, execution of the function generating a first output indicating that the function, based on the one or more parameters, was unable to locate the portion of data;
re-executing the function based on the one or more parameters and in response to the first output indicating that the function was unable to locate the portion of data, the re-executing of the function causing the function to generate a second output indicating that the function, based on the one or more parameters, was able to locate the portion of data;
based on the re-executing of the function, executing the logic to process the portion of data and generate the one or more results; and
associating the one or more results with the at least one output dataset.

2. The computer-implemented method of claim 1, wherein the one or more parameters comprise data specifying at least one geographical locale, and the executing of the function causes the function to query the data of the at least one input dataset to determine, based on processing the one or more parameters, when one or more records of the data comprise associated metadata including a reference to the geographical locale.

3. The computer-implemented method of claim 1, wherein analyzing the metadata identifies an additional function, the additional function to analyze the portion of data to identify timestamp data associated with the portion of data and determine when the identified timestamp data exceeds a timestamp data threshold.

4. The computer-implemented method of claim 1, wherein analyzing the metadata identifies an additional function, the additional function to analyze the portion of data to determine a reliability of the portion of data based on comparing one or more values comprised in the portion of data against one or more reference values.

5. The computer-implemented method of claim 1, wherein the analyzing of the metadata identifies an additional function, the additional function to analyze the portion of data to ascertain a quantity of data associated with the portion of data and determine when the quantity of data at least equals a threshold value.

6. A system, comprising:
one or more processors; and
memory that stores computer-executable instructions that are executable by the one or more processors to cause the system to:
- process data of at least one dataset, based on one or more parameters, to determine when a portion of data is comprised in the data of the at least one dataset;
- evaluate an output generated from processing the data of the at least one dataset, the output signifying that processing the data of the at least one dataset was unable to locate the portion of data in the data of the at least one dataset;
- based on evaluating the output, automatically reprocess the data of the at least one dataset, based on the one or more parameters, to determine the portion of data is comprised in the data of the at least one dataset; and
- process the portion of data determined to be comprised in the data of the at least one dataset to generate a result based on the portion of data determined to be comprised in the data of the at least one dataset.

7. The system of claim 6, wherein the memory that stores the computer-executable instructions that are executable by the one or more processors are further to cause the system to:
assess metadata identifying a function and the at least one dataset, the function executable to process the data of the at least one dataset and generate the output from processing the data of the at least one dataset, and wherein reprocessing of the data of the at least one dataset is performed by executing the function.

8. The system of claim 7, wherein the metadata further identifies an additional function, the additional function executable to analyze the portion of data to identify timestamp data associated with the portion of data and determine when the identified timestamp data exceeds a timestamp data threshold.

9. The system of claim 7, wherein the metadata further identifies an additional function, the additional function to analyze the portion of data to determine a reliability of the portion of data based on comparing one or more values comprised in the portion of data against one or more reference values.

10. The system of claim 7, wherein the metadata further identifies an additional function, the additional function to analyze the portion of data to ascertain a quantity of data associated with the portion of data and determine when the quantity of data at least equals a threshold value.

11. The system of claim 6, wherein the memory that stores the computer-executable instructions that are executable by the one or more processors are further to cause the system to:
process a predetermined delay period subsequent to evaluating the output generated from processing the data of the at least one dataset and prior to automatically reprocessing the data of the at least one dataset, based on the one or more parameters, to determine the portion of data is comprised in the data of the at least one dataset.

12. The system of claim 6, wherein the memory that stores the computer-executable instructions that are executable by the one or more processors are further to cause the system to:
assess metadata identifying an operation, the operation executable to process the portion of data determined to be comprised in the data of the at least one dataset to generate the result based on the portion of data determined to be comprised in the data of the at least one dataset, and wherein executing the operation is to further comprise causing the operation to associate the result with another dataset.

13. The system of claim 6, wherein the memory that stores the computer-executable instructions that are executable by the one or more processors are further to cause the system to:

process a request to generate an output dataset comprising determined one or more values based on, at a minimum, the portion of data; and in response to processing the request, evaluate a data structure to cause the system to perform processing the data of the at least one dataset, evaluating the output generated from processing the data of the at least one dataset, automatically reprocessing the data of the at least one dataset, and processing the portion of the data determined to be comprised in the data of the at least one dataset to generate the result, and associate the result with the one or more values comprised in the output dataset.

14. A system, comprising:

one or more processors; and memory that stores computer-executable instructions that are executable by the one or more processors to cause the system to:

assess metadata linked to a system that locates, obtains, and processes data, assessing the metadata revealing that the metadata identifies a function and an operation;

execute the function to process data of at least one dataset, based on one or more parameters, to determine a portion of data is comprised in the data of the at least one dataset, executing the function to process the data of the at least one dataset automatically performed subsequent to determining, through a previous execution of the function, the portion of data is missing in the data of the at least one dataset; and execute the operation on the portion of data to provide one or more output values generated from processing the portion of data.

15. The system of claim 14, wherein the memory that stores the computer-executable instructions that are executable by the one or more processors are further to cause the system to:

obtain a request to generate the one or more output values;

based on obtaining the request, locate a data structure, associated with a plurality of data structures, linked to the request; and analyze the data structure to identify the metadata.

16. The system of claim 14, wherein executing the function to determine the portion of data is comprised in the data of the at least one dataset is delayed a predetermined duration after the previous execution of the function.

17. The system of claim 14, wherein the metadata further identifies an additional function, the additional function executable to analyze the portion of data to identify timestamp data associated with the portion of data and determine when the identified timestamp data exceeds a timestamp data threshold.

18. The system of claim 14, wherein the metadata further identifies an additional function, the additional function to analyze the portion of data to determine a reliability of the portion of data based on comparing one or more values comprised in the portion of data against one or more reference values.

19. The system of claim 14, wherein the metadata further identifies an additional function, the additional function to analyze the portion of data to ascertain a quantity of data associated with the portion of data and determine when the quantity of data at least equals a threshold value.

20. The system of claim 14, wherein the memory that stores the computer-executable instructions that are executable by the one or more processors are further to cause the system to:

analyze a data structure to identify the metadata, the data structure is usable by the system that locates, obtains, and processes data to generate at least one report data structure comprising the one or more output values generated from processing the portion of data, and wherein the system that locates, obtains, and processes data comprises an extract, transform, load (ETL) processor.

21. A system, comprising:

one or more processors; and memory that stores computer-executable instructions that are executable by the one or more processors to cause the system to:

assess metadata linked to a system that locates, obtains, and processes data, assessing the metadata revealing that the metadata identifies a function and an operation;

execute the function to process data of at least one dataset, based on one or more parameters, to determine a portion of data is comprised in the data of the at least one dataset; and execute the operation on the portion of data to provide one or more output values generated from processing the portion of data.

22. The system of claim 21, wherein executing the function to process the data of the at least one dataset is performed subsequent to determining, through a previous execution of the function, the portion of data is missing in the data of the at least one dataset.

23. The system of claim 21, wherein the memory that stores the computer-executable instructions that are executable by the one or more processors are further to cause the system to:

obtain a request to generate the one or more output values;

based on obtaining the request, locate a data structure, associated with a plurality of data structures, linked to the request; and analyze the data structure to identify the metadata.

24. The system of claim 21, wherein the metadata further identifies an additional function, the additional function executable to analyze the portion of data to identify timestamp data associated with the portion of data and determine when the identified timestamp data exceeds a timestamp data threshold.

25. The system of claim 21, wherein the metadata further identifies an additional function, the additional function to analyze the portion of data to determine a reliability of the portion of data based on comparing one or more values comprised in the portion of data against one or more reference values.

26. The system of claim 21, wherein the metadata further identifies an additional function, the additional function to analyze the portion of data to ascertain a quantity of data associated with the portion of data and determine when the quantity of data at least equals a threshold value.

\* \* \* \* \*